Nov. 21, 1933.  G. ZAPF  1,936,282
METHOD OF MEASURING THE ELONGATION OF HOLLOW CABLES
Filed Oct. 13, 1930
Fig.
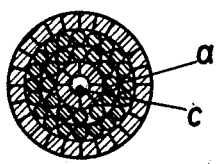
Fig. 2.
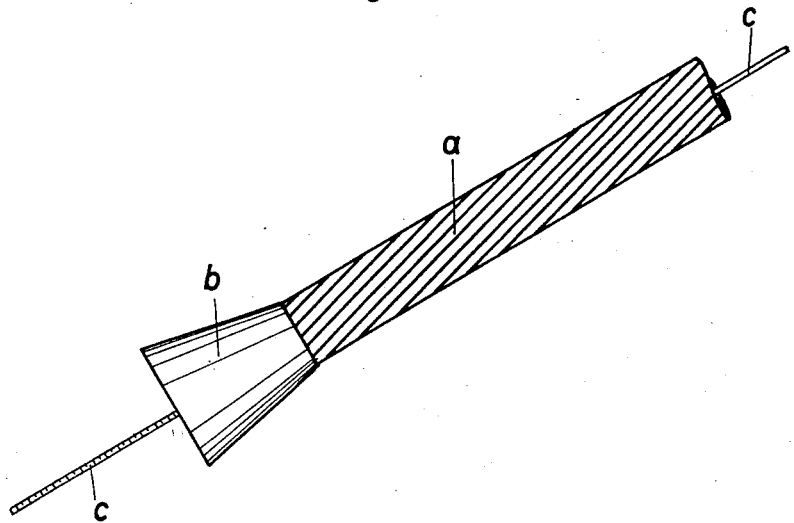

Patented Nov. 21, 1933

1,936,282

UNITED STATES PATENT OFFICE 1,936,282

METHOD OF MEASURING THE ELONGATION OF HOLLOW CABLES

Georg Zapf, Cologne, Germany, assignor to Felten & Guilleaume Carlswerk Actien-Gesellschaft, Cologne-Mulheim, Germany Application October 13, 1930, Serial No. 488,461, and in Germany October 23, 1929

1 Claim. (Cl. 73—51)

In carrying ropes, more particularly bridge ropes for suspension bridges, it is desirable to be able to determine the extension which occurs when the ropes are subjected to load. Determinations by subsequent measurement of the length of the rope under load and a comparison of this length of the rope with its length before the application of the load involve a considerable amount of trouble and, in the case of great lengths of rope, are very inaccurate.

The present invention relates to a wire rope which is provided with an arrangement which makes it possible to determine the extension of the wire rope which takes place under the influence of the load without any separate measuring devices directly on the loaded rope itself. For this purpose measuring wire preferably of steel, similar to a piano wire is provided in the interior of the rope, so as to be free from friction and independent of the rope wires surrounding it, such that, on the rope being placed under load, it takes up no part of the load. As this wire retains its original length, even when the rope is loaded, the difference in length between the measuring wire within the rope and the rope itself gives the extension which has taken place under the influence of a load. For providing the requisite clearance for the measuring wire, the rope is made hollow.

One possible constructional form of the measuring arrangement is illustrated in the accompanying drawing. Fig. 1 shows a section through the rope with the measuring wire within it and Fig. 2 is a side view showing the arrangement of the separate parts. $a$ is the hollow rope, $b$ one end of the same and $c$ the measuring wire. The hollow space within the rope for the reception of the measuring wire is produced by the core of the rope having the form of a hollow rope made of separate profiled wires, for instance wires having a section of the form of a sector of an annulus, which abut against one another. The measuring wire is disposed in this hollow space so as to be capable of moving freely therein. When fixing in position a rope constructed according to the invention, the measuring wire disposed within it may, for facilitating the measurement of extension, be fixed together with one end of the rope, while at the other end of the rope the measuring wire, which must of course be longer than the rope to be measured, is passed freely through the fixing place. This last-named end of the rope is shown in Fig. 2.

That portion of the measuring wire, by which the measuring wire is longer than the rope, is suitably marked with a scale, so that, on the rope being loaded, the extension of the rope can be read off directly on the measuring wire. The material used for the measuring wire is preferably one in which the expansion due to heat is very small, for instance invar.

It should be remarked that the construction of the wire shown in the drawing is only given as an example and that other constructional forms are possible if they fulfill the condition that the measuring wire is so disposed in them as to be as free from friction as possible. Thus, for instance, the space in the interior of the rope for containing the measuring wire may also be produced by forming the core of the rope of round wires, which enclose a gusset-shaped space.

If the measuring wire intended to be disposed in the interior of the rope is to be introduced subsequently, it will be found of advantage to cause it to rotate at a high speed of revolution for facilitating its insertion.

What I claim is:

A method of measuring the extension of a hollow wire rope under load, consisting in introducing into the interior of the hollow wire rope a measuring wire capable of sliding freely in said interior, loading the rope without subjecting the said wire to load and measuring the difference in length between the loaded wire rope and the measuring wire in the interior thereof.

G. ZAPF.